United States Patent [19]

Nakamura

[11] Patent Number: 4,999,716

[45] Date of Patent: Mar. 12, 1991

[54] FACSIMILE COMMUNICATION METHOD AND FACSIMILE MACHINE

[75] Inventor: Seiji Nakamura, Atsugi, Japan

[73] Assignee: Ricoh Company, Ltd., Tokyo, Japan

[21] Appl. No.: 388,814

[22] Filed: Aug. 3, 1989

[30] Foreign Application Priority Data

Aug. 12, 1988 [JP] Japan ............................ 63-201176
Aug. 17, 1988 [JP] Japan ............................ 63-205060
Apr. 18, 1989 [JP] Japan ............................ 64-99777

[51] Int. Cl.$^5$ ............................................ H04N 1/00
[52] U.S. Cl. .................................. 358/434; 358/435; 358/439
[58] Field of Search ............... 358/431, 434, 435, 439; 371/32, 5.5

[56] References Cited

U.S. PATENT DOCUMENTS 4,589,111  5/1986  Adachi .................................. 371/32
4,860,115  8/1989  Ogura .................................. 358/443
4,876,609  10/1989  Ogura .................................. 358/434
4,887,162  12/1989  Arai ...................................... 358/434
4,910,610  3/1990  Utsugi .................................. 358/434

FOREIGN PATENT DOCUMENTS 52-94715  8/1977  Japan .
59-165540  9/1984  Japan .
62-60873  12/1987  Japan .

Primary Examiner—Edward L. Coles, Sr.
Attorney, Agent, or Firm—Oblon, Spivak, McClelland, Maier & Neustadt

[57] ABSTRACT

In a facsimile communication method, a receiving facsimile machine receives a training check field signal TCF from a transmitting facsimile machine and sends a confirmation to receive signal CFR or a failure to train signal FTT to the transmitting facsimile machine depending on a result of the reception of the training check field signal TCF so as to determine a modem transmission speed. A number of erroneous bits in the training check field signal TCF which is sent from the transmitting facsimile machine at an initial modem transmission speed and received by the receiving facsimile machine is detected, and the modem transmission speed is set based on the detected number of erroneous bits. A facsimile information bit which indicates the set modem transmission speed is added to the failure to train signal FTT which is sent from the receiving facsimile machine to the transmitting facsimile machine. The training check filed signal TCF is sent from the transmitting facsimile machine to the receiving facsimile machine at the modem transmission speed indicated by the failure to train signal FTT.

20 Claims, 10 Drawing Sheets

FACSIMILE COMMUNICATION METHOD AND FACSIMILE MACHINE

BACKGROUND OF THE INVENTION

The present invention generally relates to facsimile communication methods and facsimile machines, and more particularly to a facsimile communication method which quickly determines a modem transmission speed and a facsimile machine which employs such a facsimile communication method.

When a call set up is made and a predetermined control procedure is completed in a facsimile communication, a modem transmission speed is determined prior to transmission of image data. Conventionally, the modem transmission speed is determined as follows. That is, a source or transmitting facsimile machine sends a training check field signal TCF to a destination or receiving facsimile machine at a predetermined transmission speed. Normally, the training check field signal TCF has a predetermined number of consecutive "0"s. The destination facsimile machine detects a number of erroneous bits of the received training check field signal TCF and returns to the source facsimile machine a confirmation to receive signal CFR or a failure to train signal FTT depending on whether or not the number of erroneous bits is less than or equal to a predetermined reference value. The erroneous bits will hereinafter be referred to as a bit error and the number of erroneous bits will be referred to as a bit error number.

Normally, the source facsimile machine sends the training check field signal TCF at a maximum transmission speed (for example, 9600 bps) and the destination facsimile machine detects the bit error number of the received training check field signal TCF. When the bit error number is less than or equal to the predetermined reference value, the destination facsimile machine returns the confirmation to receive signal CFR to the source facsimile machine and the maximum transmission speed is adopted. On the other hand, the destination facsimile machine returns the failure to train signal FTT to the source facsimile machine when the bit error number is greater than the predetermined reference value. When the source facsimile machine receives the failure to train signal FTT, the source facsimile machine retransmits the training check field signal TCF at a transmission speed which is one step slower than the maximum transmission speed. The source facsimile machine successively reduces the transmission speed of the training check field signal TCF in steps until the confirmation to receive signal CFR is received from the destination facsimile machine. Hence, the destination facsimile machine returns the confirmation to receive signal CFR and the transmission speed is determined when the bit error number of the training check field signal TCF becomes less than or equal to the predetermined reference value.

However, the modem transmission speed is conventionally determined by starting from the maximum transmission speed and successively reducing the transmission speed in steps until the bit error number of the received training check field signal TCF becomes less than or equal to the predetermined reference value. In other words, every time the bit error number of the training check field signal TCF received by the destination facsimile machine is greater than the predetermined reference value, the source facsimile reduces the transmission speed by one step and sends the training check field signal TCF at the reduced transmission speed. As a result, there are problems in that it takes a long time to determine the transmission speed when the detected bit error number of the received training check field signal TCF is relatively large and an accounting on the facsimile communication becomes expensive. Especially when the state of the line is poor and the transmission speed is slow, the signals TCF and FTT must be sent repeatedly until the transmission speed is determined, and time is unnecessarily wasted before the transmission of the image data is actually started.

The generation of the bit error in the training check field signal TCF is caused by a stationary factor or a non-stationary factor. The stationary factor includes an amplitude jitter, a phase jitter, a signal-to-noise ratio (S/N) of the communication line and the like which causes a stationary line deterioration. On the other hand, the non-stationary factor includes an amplitude hit, a phase hit, an impulse noise and the like.

When conventionally determining the transmission speed by discriminating the line quality, the discrimination also takes into account the bit error caused by the non-stationary factor. For this reason, even when the stationary line deterioration is tolerable and the stationary factor does not cause a significant bit error, the training fails if an increase of the bit error number is caused by the non-stationary factor. This means that the transmission speed must be reduced in steps until the bit error number of the received training check field signal TCF caused by the non-stationary factor becomes less than or equal to the predetermined reference value, and the bit error number must be checked every time the transmission speed is reduced. As a result, the duration and accounting of the facsimile communication increase.

SUMMARY OF THE INVENTION

Accordingly, it is a general object of the present invention to provide a novel and useful facsimile communication method and a facsimile machine which employs such a facsimile communication method, in which the problems described above are eliminated.

Another and more specific object of the present invention is to provide a facsimile communication method in which a destination facsimile machine receives a training check field signal TCF from a source facsimile machine and sends a confirmation to receive signal CFR or a failure to train signal FTT to the source facsimile machine depending on a result of the reception of the training check field signal TCF so as to determine a modem transmission speed, which facsimile communication method comprises the steps of detecting a number of erroneous bits in the training check field signal TCF which is sent from the source facsimile machine at an initial modem transmission speed and received by the destination facsimile machine, setting the modem transmission speed based on the detected number of erroneous bits, adding a facsimile information bit which indicates the set modem transmission speed to the failure to train signal FTT which is sent from the destination facsimile machine to the source facsimile machine, and sending the training check field signal TCF from the source facsimile machine to the destination facsimile machine at the modem transmission speed indicated by the failure to train signal FTT. According to the facsimile communication method of the present invention, it is possible to carry out a modem training by quickly selecting a transmission speed appropriate for the state or quality of the line, and the transmission speed can be determined quickly. As a result, it is possible to reduce the communication time and the accounting on the communication.

Still another object of the present invention is to provide a facsimile communication method in which a destination facsimile machine receives a training check field signal TCF from a source facsimile machine and sends a confirmation to receive signal CFR or a failure to train signal FTT to the source facsimile machine depending on whether a training is a success or failure, which facsimile communication method comprises the steps of dividing the training check field signal TCF which is sent from the source facsimile machine and received by the destination facsimile machine into a plurality of blocks and detecting a number of erroneous bits in each of the blocks, detecting the success or failure of the training based on the detected number of erroneous bits, sending the confirmation to receive signal CFR from the destination facsimile machine to the source facsimile machine when the success of the training is detected, and sending the failure to train signal FTT from the destination facsimile machine to the source facsimile machine when the failure of the training is detected. The step of detecting the success or failure includes a first substep of detecting the success when a total number of erroneous bits in the blocks is less than a predetermined value and a second substep of detecting the success or failure based on the number of erroneous bits in each block when the total number of erroneous bits in the blocks is greater than or equal to the predetermined value. According to the facsimile communication method of the present invention, it is possible to prevent the training from being judged a failure due to bit errors caused by a non-stationary factor, and the success or failure of the training is judged based solely on the bit errors caused by a stationary factor. As a result, it is possible to reduce the communication time and the accounting on the communication.

A further object of the present invention is to provide a facsimile machine which receives a training check field signal TCF from a source facsimile machine and sends a confirmation to receive signal CFR or a failure to train signal FTT to the source facsimile machine depending on a result of the reception of the training check field signal TCF so as to determine a modem transmission speed, which facsimile machine comprises modem means coupled to a data transmission path for modulating a transmitting image data which is transmitted to the data transmission path and for demodulating received image data which is received from the data transmission path, communication control means coupled to the modem means for controlling communications to and from the data communication path, reading means for reading a document image which is to be transmitted and for outputting the transmitting image data describing the document, recording means for recording an image described by the received image data onto a recording sheet, and system control means for controlling operations of the communication control means, the reading means and the recording means. The system control means comprises means for detecting a number of erroneous bits in the training check field signal TCF which is sent from the source facsimile machine at an initial modem transmission speed and received by the destination facsimile machine, means for setting the modem transmission speed based on the detected number of erroneous bits, means for adding a facsimile information bit which indicates the set modem transmission speed to the failure to train signal FTT which is sent from the destination facsimile machine to the source facsimile machine, and means for sending the training check field signal TCF from the source facsimile machine to the destination facsimile machine at the modem transmission speed indicated by the failure to train signal FTT. According to the facsimile machine of the present invention, it is possible to carry out a modem training by quickly selecting a transmission speed appropriate for the state or quality of the line, and the transmission speed can be determined quickly. As a result, it is possible to reduce the communication time and the accounting on the communication.

Another object of the present invention is to provide a facsimile machine which receives a training check field signal TCF from a source facsimile machine and sends a confirmation to receive signal CFR or a failure to train signal FTT to the source facsimile machine depending on whether a training is a success or failure, which facsimile machine comprises modem means coupled to a data transmission path for modulating a transmitting image data which is transmitted to the data transmission path and for demodulating received image data which is received from the data transmission path, communication control means coupled to the modem means for controlling communications to and from the data communication path, reading means for reading a document image which is to be transmitted and for outputting the transmitting image data describing the document, recording means for recording an image described by the received image data onto a recording sheet, and system control means for controlling operations of the communication control means, the reading means and the recording means. The system control means comprises means for dividing the training check field signal TCF which is sent from the source facsimile machine and received by the destination facsimile machine into a plurality of blocks and detecting a number of erroneous bits in each of the blocks, means for detecting the success or failure of the training based on the detected number of erroneous bits, means for sending the confirmation to receive signal CFR from the destination facsimile machine to the source facsimile machine when the success of the training is detected, and means for sending the failure to train signal FTT from the destination facsimile machine to the source facsimile machine when the failure of the training is detected. The means for detecting the success or failure includes first means for detecting the success when a total number of erroneous bits in the blocks is less than a predetermined value and a second means for detecting the success or failure based on the number of erroneous bits in each block when the total number of erroneous bits in the blocks is greater than or equal to the predetermined value. According to the facsimile machine of the present invention, it is possible to prevent the training from being judged a failure due to bit errors caused by a non-stationary factor, and the success or failure of the training is judged based solely on the bit errors caused by a stationary factor. As a result, it is possible to reduce the communication time and the accounting on the communication.

Other objects and further features of the present invention will be apparent from the following detailed description when read in conjunction with the accompanying drawings.

DESCRIPTION OF THE PREFERRED EMBODIMENTS

Figure 1:
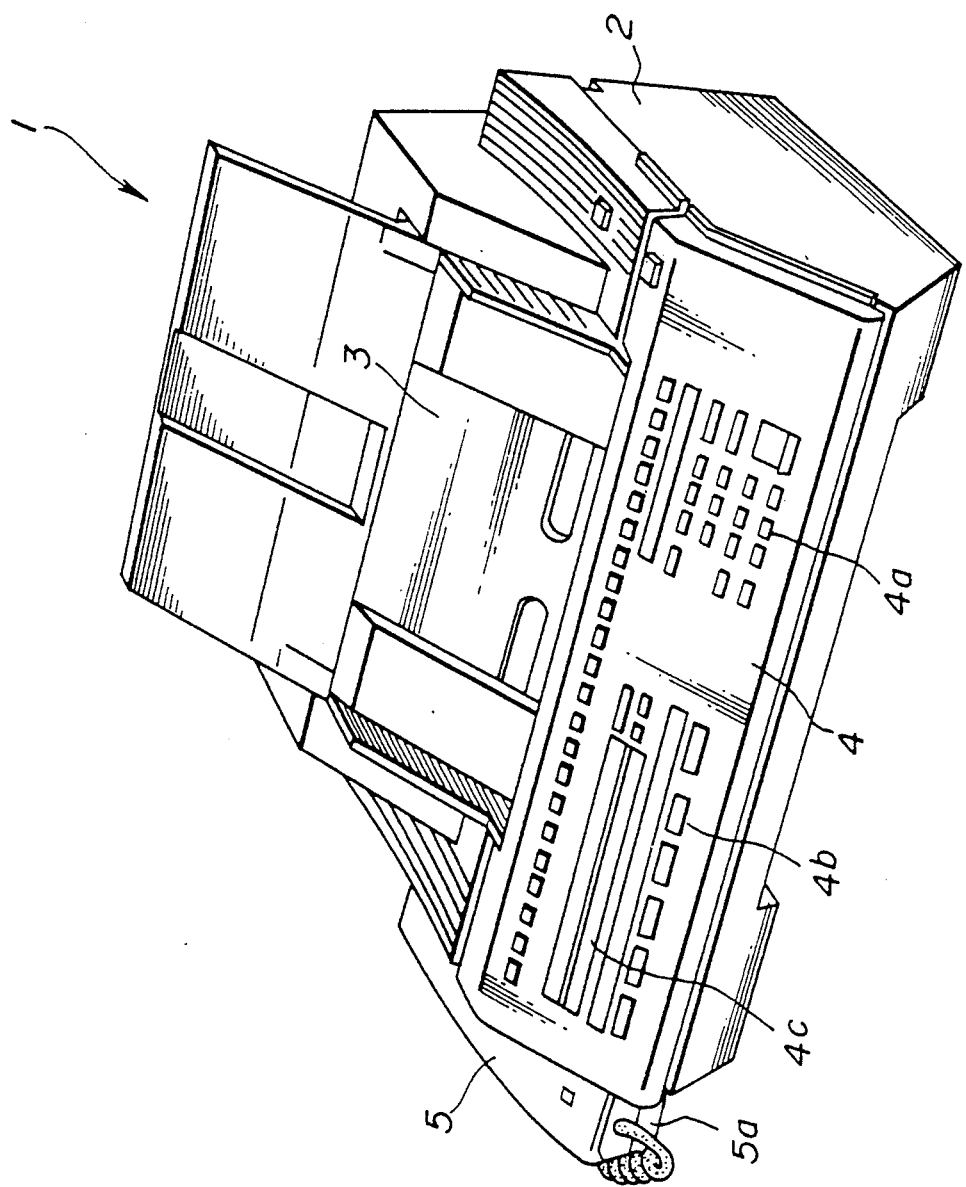
FIG. 1 is a perspective view generally showing an external appearance of a facsimile machine according to the present invention.

FIG. 1 generally shows an external appearance of a first embodiment of a facsimile machine according to the present invention. A facsimile machine 1 generally comprises a main body 2, a document tray 3 which is provided on an upper portion of the main body 2, a control and display part 4, a handset 5 and the like. A document (not shown) is placed on the document tray 3. The control and display part 4 includes a ten-key 4a, keys 4b for entering commands, a display 4c for displaying input commands and information such as messages intended for an operator and output from the facsimile machine 1. The handset 5 is hooked on a receiving part 5a which is provided on the main body 2.

Figure 2:
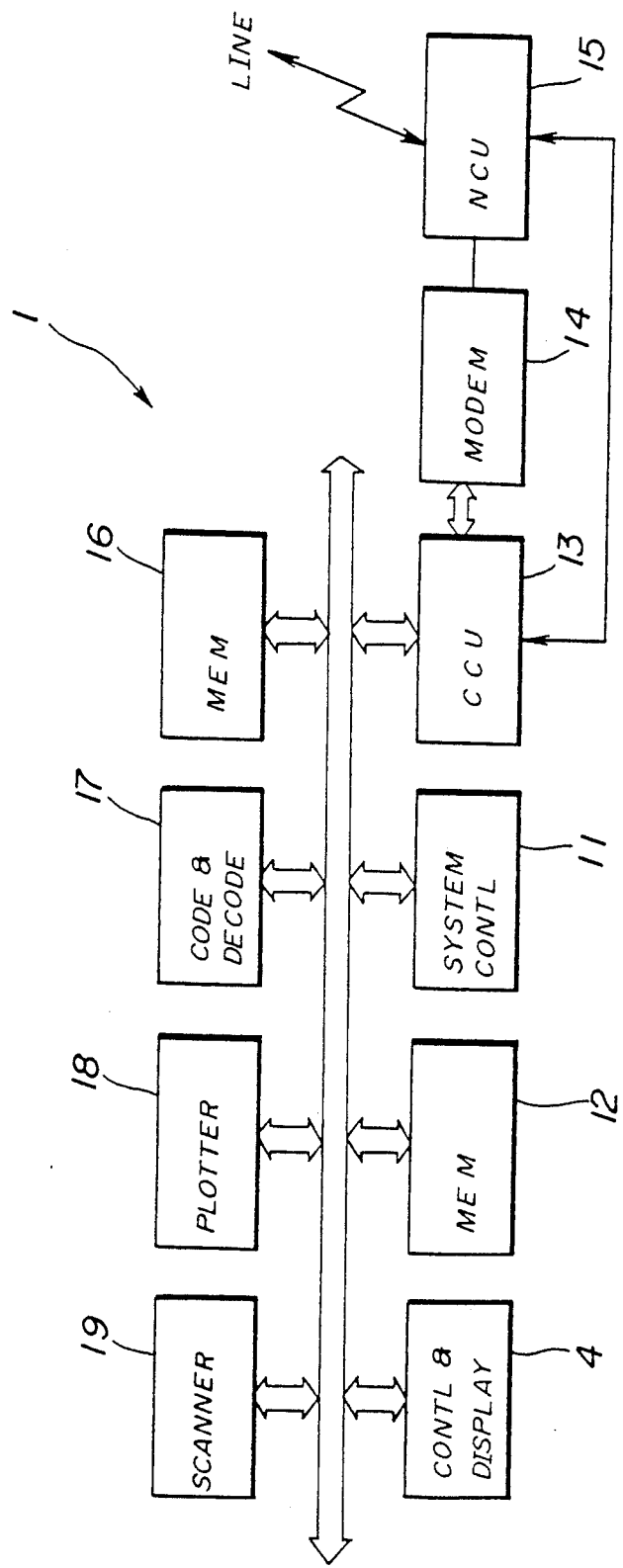
FIG. 2 is a system block diagram showing a first embodiment of the facsimile machine according to the present invention.

FIG. 2 shows a block system of the facsimile machine 1. As shown in FIG. 2, the facsimile machine 1 generally comprises a system controller 11, a system memory 12, a communication control unit 13, a modem 14, a network control unit 15, an image memory 16, a coding and decoding part 17, a plotter 18, a scanner 19, and the operation and control part 4.

The system controller 11 includes an internal read only memory (ROM) or the like which stores control programs for controlling the entire facsimile machine 1 and programs for carrying out a transmission speed setting process. The system controller 11 controls each part of the facsimile machine 1 according to the programs stored in the internal ROM, and executes a sequence of the facsimile machine 1 and the transmission speed setting process which constitutes an essential part of a facsimile communication method according to the present invention.

The system memory 12 provides a work area and also stores parameters for carrying out various control operations including parameters which are used for the transmission speed setting process. The parameters used for the transmission speed setting process are an bit error number of the training check field signal TCF, a confirmation to receive signal CFR which is set in correspondence with the bit error number, a transmission speed to be inserted into a failure to train signal FTT and the like. A file administration table is formed for each telegraphic message (that is, the image information) which is stored in the image memory 16. Administration items of the file administration table of the telegraphic message includes an information indicating whether or not it is a personal identification, a personal identification number, a number of pages of the telegraphic message and the like.

The image memory 16 stores the telegraphic message which is coded in the coding and decoding part 17 by the modified Huffman (MH) coding scheme, for example. The administration of the telegraphic message stored in the image memory 16 is carried out by the system controller 11 according to the file administration table stored in the system memory 12.

The coding and decoding part 17 is provided to reduce the transmission time of the telegraphic message and improve the transmission efficiency. The coding and decoding part 17 codes (compresses) the telegraphic message at the time of the transmission and decodes (expands) the coded telegraphic message at the time of the reception.

For example, a thermal printer having thermal elements is used as the plotter 18. The plotter 18 records an image directly on a thermally sensitive paper or indirectly on a plain paper via an ink ribbon.

For example, a line image sensor using charge coupled devices (CCDs) is used as the scanner 19. The scanner 19 reads each line of the document image and outputs the read document image as the telegraphic message.

The communication control unit 13 exchanges facsimile control signals between the destination facsimile machine and carries out a control procedure.

The modem 14 modulates the telegraphic message into a modulated signal which has a signal format suited for transmission on an external line at the time of the transmission. At the time of the reception, the modem 14 demodulates the modulated signal received via the external line.

The network control unit 15 is generally referred to as an AA-NCU. The external line and the handset 5 are connected to the network control unit 15. The network control unit 15 automatically makes a call out to the destination and automatically makes a call in with respect to the call out received via the external line.

Next, a description will be given of the operation of the first embodiment. When making a transmission or storing a telegraphic message, the scanner 19 of the facsimile machine 1 scans and reads the documents which are set on the document tray 3 one document at a time from the first page thereof. The read telegraphic message is supplied to the coding and decoding part 17 and is coded therein. In a storage mode, the telegraphic message is stored in the image memory 16 and the stored telegraphic image is thereafter transmitted at a predetermined time. In a transmission mode, the telegraphic message is supplied to the modem 14 via the communication control unit 13 and the modulated telegraphic message is sent to the line via the network control unit 15.

On the other hand, the facsimile machine 1 in a reception mode demodulates the telegraphic message (modulated signal) which is received via the line in the modem 14 and stores the demodulated telegraphic message in the image memory 16. The (demodulated) telegraphic message which is stored in the image memory 16 is read out immediately or at a predetermined time and supplied to the coding and decoding part 17. The coding and decoding part 17 decodes the read out telegraphic message and supplies the decoded telegraphic message to the plotter 18. The plotter 18 records the received telegraphic message on a recording paper.

When making the above described transmission and reception, the facsimile machine 1 must determine the transmission speed. A description will now be given of a transmission speed setting process, by referring to a time chart of the control signals shown in FIG. 3 which are transmitted and received between source and destination (transmitting and receiving) facsimile machines and a flow chart shown in FIG. 4 for explaining the transmission speed setting process of the system controller 11 shown in FIG. 2. For the sake of convenience, it will be assumed that the facsimile machine 1 shown in FIGS. 1 and 2 is used as both the source facsimile machine and the destination facsimile machine.

Figure 3:
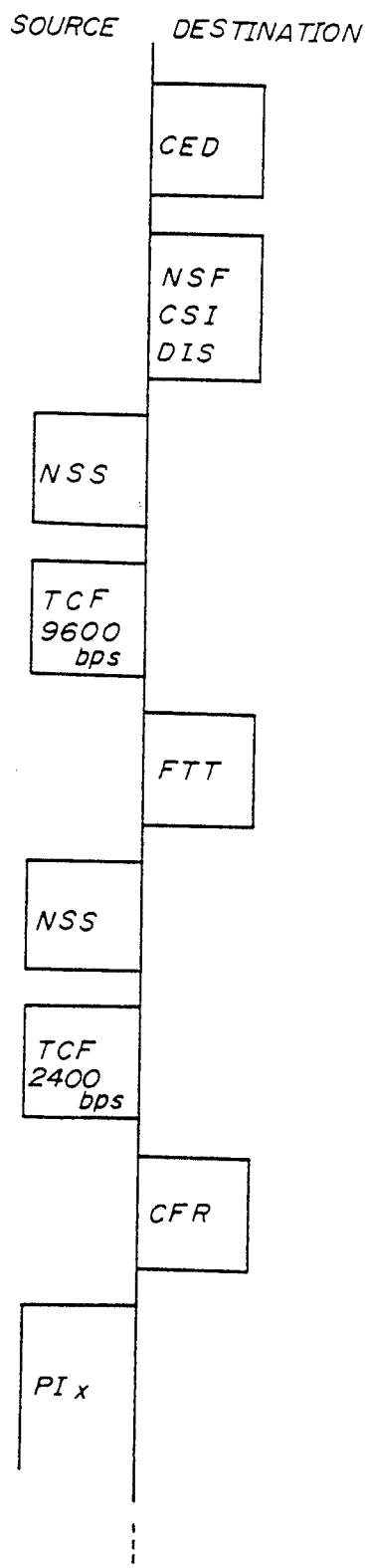
FIG. 3 is a time chart for explaining control signals which are transmitted and received between source and destination facsimile machines.
Figure 5:
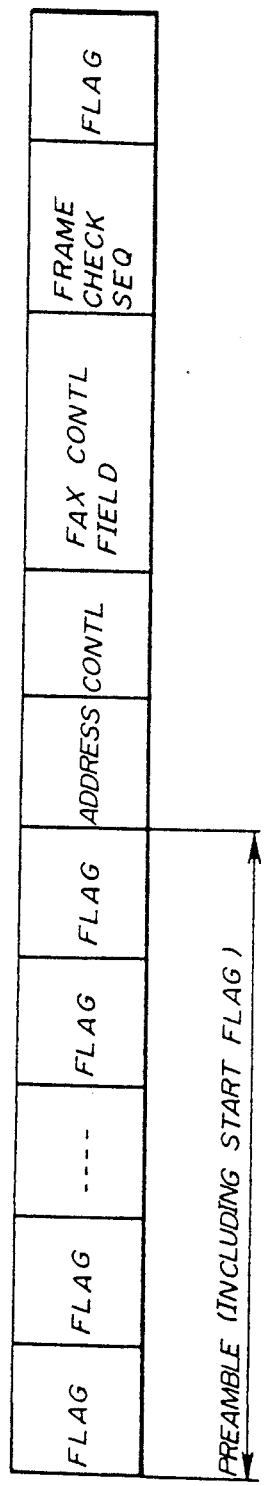
FIG 5 shows a signal format of a conventional failure to train signal FTT.
Figure 6:
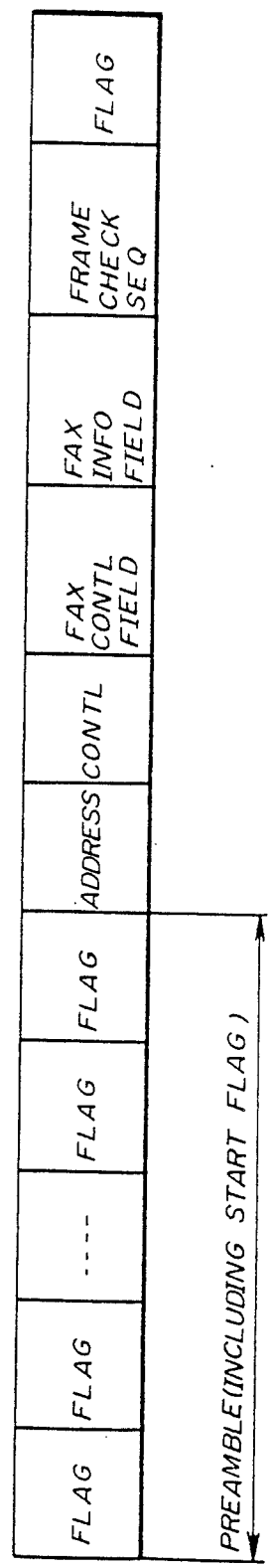
FIG. 6 shows a signal format of a failure to train signal FTT used in the present invention.

In FIG. 3, the control signals output from the source facsimile machine 1 are shown under the column "source" and the control signals output from the destination facsimile machine 1 are shown under the column "destination". When a call out is made from the source facsimile machine 1, the destination facsimile machine 1 sends out a called station identification signal CED. The destination facsimile machine 1 also sends out a non-standard facilities signal NSF and a digital identification signal DIS. A non-standard function is indicated by the non-standard facilities signal NSF, and this function indicates whether or not a new failure to train signal FTT which is added with a facsimile information field (bits) FIF as shown in FIG. 6 can be used as the failure to train signal FTT shown in FIG. 5 which is in conformance with the CCITT recommendations T.30.

Figure 4:
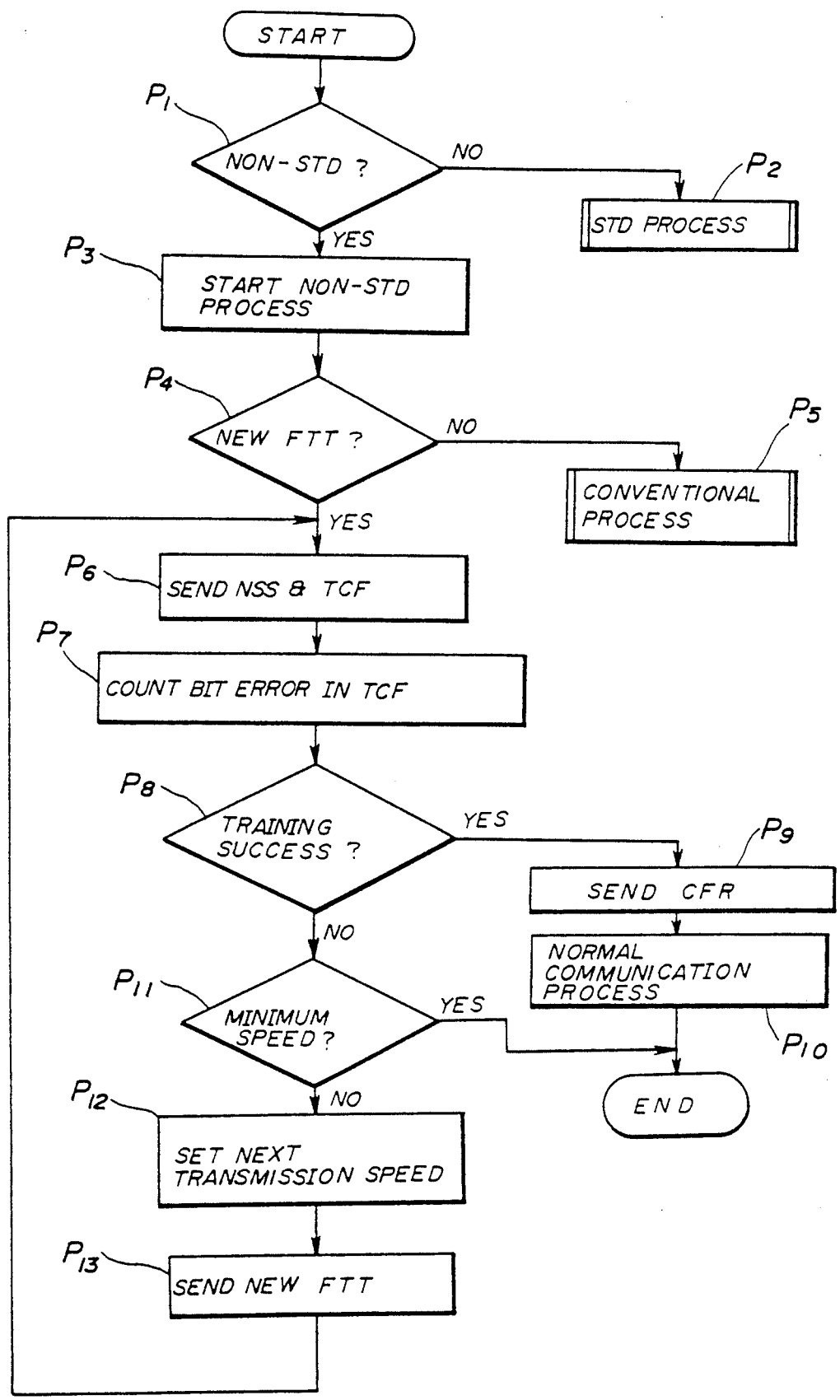
FIG. 4 is a flow chart for explaining a transmission speed setting process of a system controller shown in FIG. 2.

In a step P1 shown in FIG. 4, the system controller 11 of the source facsimile machine 1 which receives the non-standard facilities signal NSF discriminates whether or not the non-standard facilities signal NSF indicates a non-standard function. When the discrimination result in the step P1 is NO, a step P2 carries out a standard process, that is, a normal transmission procedure. On the other hand, when the discrimination result in the step P1 is YES, a step P3 starts a non-standard process. A step P4 discriminates whether or not the non-standard process uses the new failure to train signal FTT. When the discrimination result in the step P4 is NO, a step P5 carries out a conventional transmission speed setting procedure.

But when the discrimination result in the step P4 is YES, a step P6 sends a non-standard facilities set-up signal NSS and a training check field signal TCF. When sending the non-standard facilities set-up signal NSS, the source facsimile machine 1 adds a predetermined number of bits to indicate whether or not the failure to train signal FTT is the conventional failure to train signal shown in FIG. 5 or the new failure to train signal shown in FIG. 6, and the training check field signal TCF is transmitted at a maximum transmission speed which is 9600 bps in this embodiment.

The training check field signal TCF has a predetermined number of consecutive "0"s. In a step P7, the system controller 11 of the destination facsimile machine 1 counts the number of erroneous bits (bit error number) of the failure to train signal TCF. The bit error number is counted by entering the received data of the training check field signal TCF which is received by the modem 14 of the destination facsimile machine 1 into the system controller 11 one byte at a time and counting a number of bits which has changed from "0" to "1" in each byte. In other words, when counting the bit error number of the training check field signal TCF, the system controller 11 carries out a bit error calculation process shown in FIG. 7.

Figure 7:
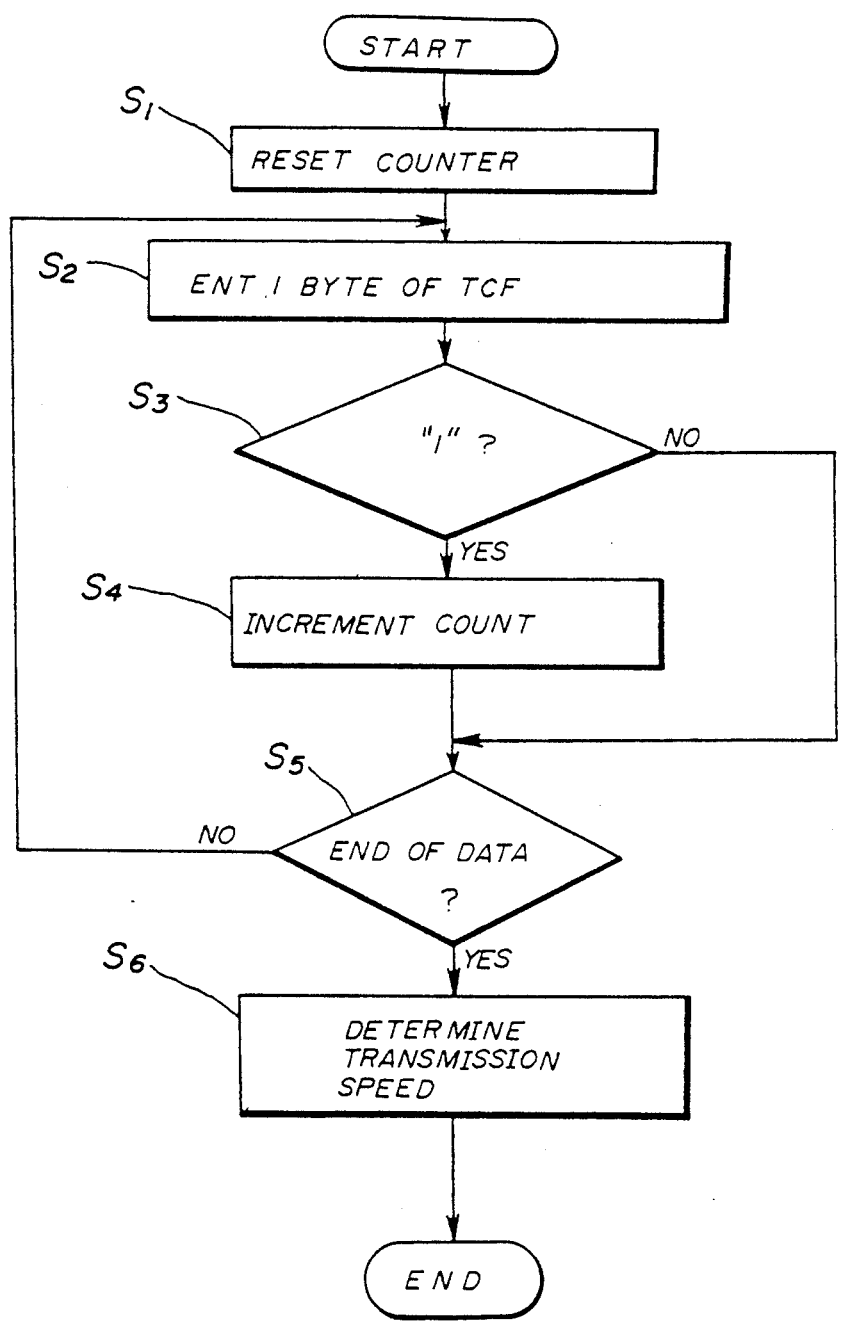
FIG. 7 is a flow chart for explaining a bit error calculation process of the system controller shown in FIG. 2.

In FIG. 7, a step S1 clears an internal counter of the system controller 11, and a step S2 enters the received data of the training check field signal TCF one byte at a time. A step S3 discriminates whether or not each bit is "1" in the one byte of received data which is entered. When the discrimination result in the step S3 is YES, a step S4 increments the count of the internal counter by one. When the discrimination result in the step S3 is NO or after the step S4, a step S5 discriminates whether or not the received data of the training check field signal TCF is ended. The process returns to the step S2 when the discrimination result in the step S5 is NO. But when the discrimination result in the step S5 is YES, a step S6 determines whether or not the transmission speed is appropriate from the bit error number of the training check field signal TCF and determines an appropriate transmission speed if in the negative. That is, the system controller 11 determines an appropriate transmission speed by comparing the count of the internal counter and a predetermined number, and the source facsimile machine 1 is informed of the appropriate transmission speed. The process shown in FIG. 7 is ended after the step S6.

As described above, processing parameters corresponding to the bit error numbers of the training check field signal TCF are set in the system memory 12 of the destination facsimile machine 1. For example, when the training is made at the transmission speed of 9600 bps as shown in the following Table 1, the transmission speed is regarded appropriate when the bit error number is up to 15 and a confirmation to receive signal CFR is set in this case. The transmission speed is set to 7200 bps when the bit error number is 16 to 80, and the transmission speed is set to 4800 bps when the bit error number is 81 or over.

TABLE 1

| Bit Error No. of TCF | Transmission Speed Set in FTT |
|---|---|
| Up to 15 Bits | CFR |
| 16 to 80 Bits | 7200 bps |
| 81 Bits or Over | 4800 bps |

For example, when the training is made at the transmission speed of 7200 bps as shown in the following Table 2, the transmission speed is regarded appropriate when the bit error number is up to 15 and the confirmation to receive signal CFR is set in this case. The transmission speed is set to 4800 bps when the bit error number is 16 to 25, and the transmission speed is set to 2400 bps when the bit error number is 26 or over.

TABLE 2

| Bit Error No. of TCF | Transmission Speed Set in FTT |
|---|---|
| Up to 15 Bits | CFR |
| 16 to 25 Bits | 4800 bps |

TABLE 2-continued

| Bit Error No. of TCF | Transmission Speed Set in FTT |
| --- | --- |
| 26 Bits or Over | 2400 bps |

Accordingly, when the training is successful and the discrimination result in the step P8 shown in FIG. 4 is YES, the system controller 11 of the destination facsimile machine 1 sends the confirmation to receive signal CFR in a step P9 and a step P10 carries out a normal communication process. On the other hand, when the discrimination result in the step P8 is NO, a step P11 discriminates whether or not the transmission speed is a minimum transmission speed. When the discrimination result in the step P11 is YES or after the step P10, the process is ended and the line is disconnected as in the conventional case.

When the discrimination result in the step P11 is NO, a step P12 sets the next transmission speed depending on the bit error number of the training check field signal TCF. A step P13 adds a facsimile information field (bits) FIF which indicates the set transmission speed to the failure to train signal FTT and sends a new failure to train signal FTT to the source facsimile machine 1. After the step P13, the process returns to the step P6, and the transmission speed is determined by repeating similar processes until the training is successful or the line is disconnected. According to this embodiment, the transmission speed at which the training is carried out is not successively reduced from the maximum transmission speed in steps as done in the conventional case. In this embodiment, the transmission speed at which the training is carried out is set depending on the bit error number of the training check field signal TCF. For this reason, it is possible to quickly select and determine the transmission speed which is appropriate for the state of the line, and the time required to carry out the control procedure for determining the transmission speed can be reduced effectively. As a result, the communication time and the accounting on the communication can be reduced.

The number of failure to train signals FTT of the training check field signal TCF, which is used as a reference when setting the transmission speed, is not limited to that of the described embodiment and may be set to an arbitrary value which is appropriate.

Figure 8:
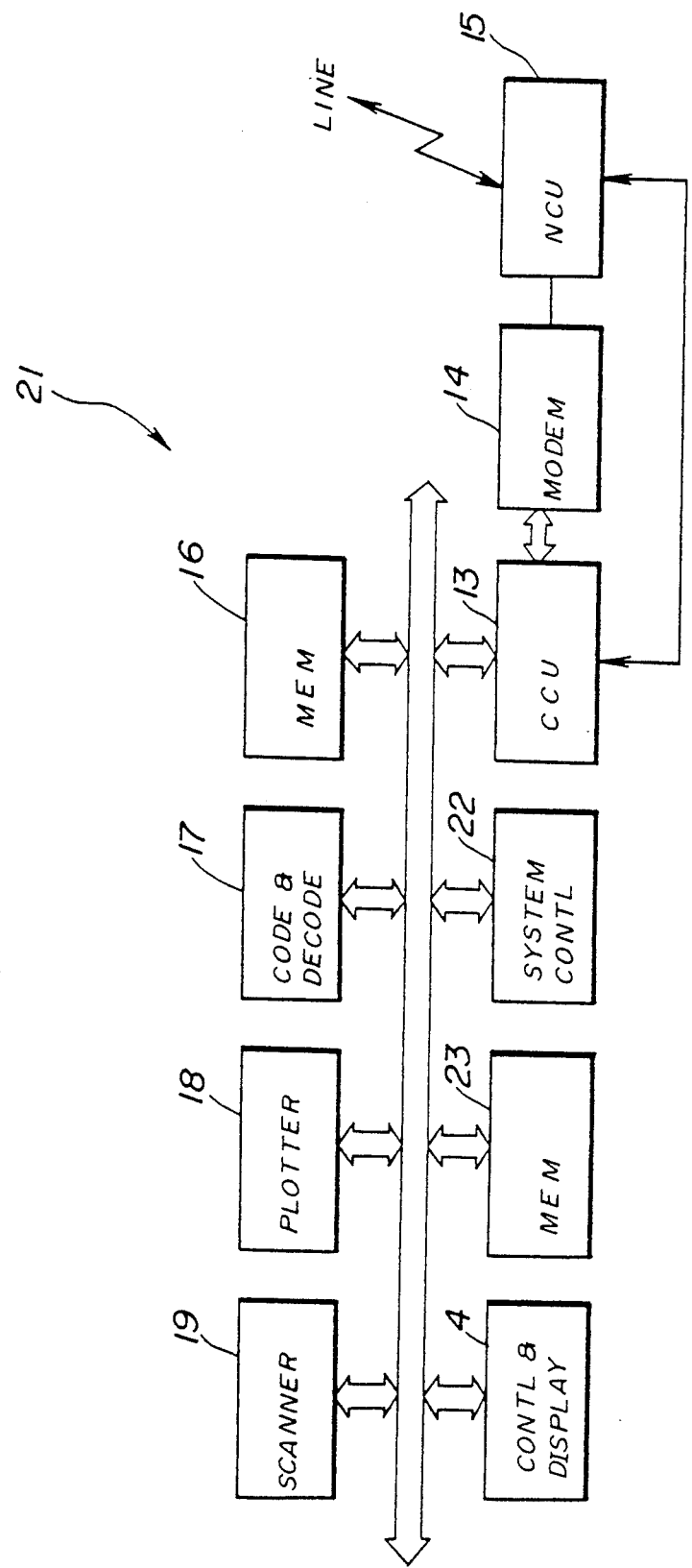
FIG. 8 is a system block diagram showing a second embodiment of the facsimile machine according to the present invention.

Next, a description will be given of a second embodiment of the facsimile machine according to the present invention, by referring to FIG. 8. In FIG. 8, those parts which are substantially the same as those corresponding parts in FIG. 2 are designated by the same reference numerals, and a description thereof will be omitted.

As shown in FIG. 8, a facsimile machine 21 generally comprises a system controller 22, a system memory 23, the communication control unit 13, the modem 14, the network control unit 15, the image memory 16, the coding and decoding part 17, the plotter 18, the scanner 19, and the operation and control part 4.

The system controller 22 includes an internal ROM or the like which stores control programs for controlling the entire facsimile machine 21 and programs for carrying out a transmission speed discriminating process. The system controller 22 controls each part of the facsimile machine 21 according to the programs stored in the internal ROM, and executes a sequence of the facsimile machine 21 and the transmission speed discriminating process which constitutes an essential part of a facsimile communication method according to the present invention.

The system memory 23 provides a work area and also stores parameters for carrying out various control operations including parameters which are used for the transmission speed discriminating process.

Figure 9:
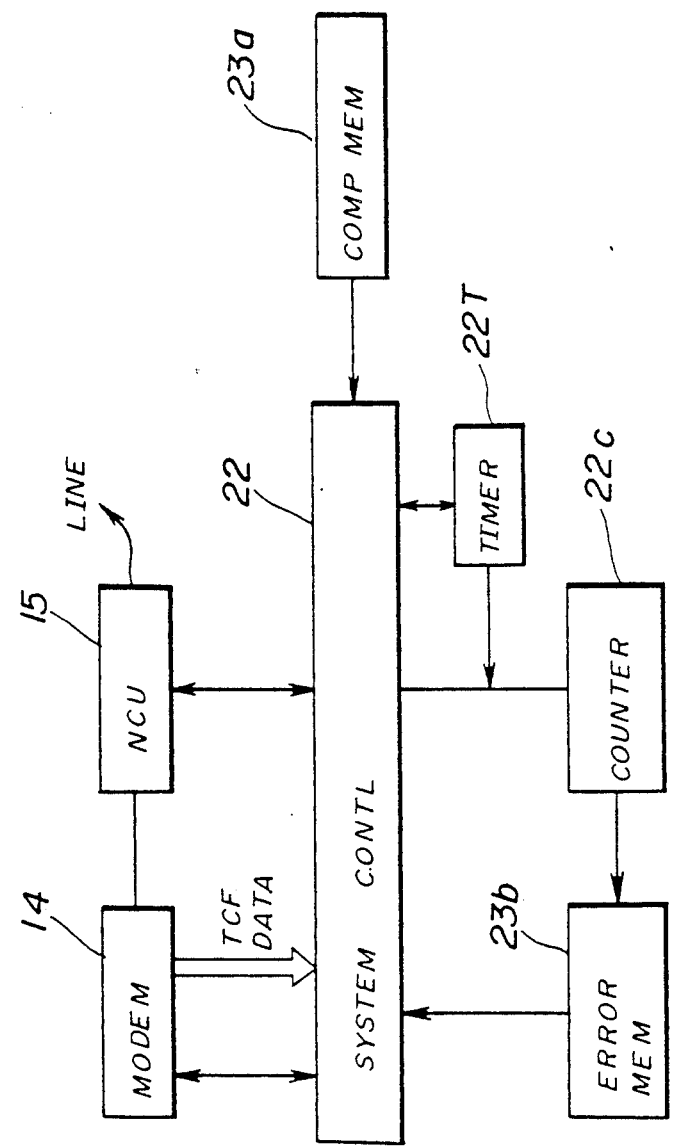
FIG. 9 is a system block diagram showing an essential part of the block system shown in FIG. 8.

FIG. 9 shows an essential part of the block system shown in FIG. 8. The system controller 22 comprises a timer 22T and a counter 22C. The timer 22T is used for dividing the training check field signal TCF in time into a plurality of blocks. The counter 22C counts the bit error number of the training check field signal TCF for each of the blocks divided in the timer 22T. The system memory 23 comprises a comparing memory part 23a and an error memory part 23b. The error memory part 23b stores the bit error number of the training check field signal TCF for each of the blocks. The comparing memory part 23a stores a bit error number (predetermined reference value) which is used as a reference in discriminating a success or failure of the training and a bit error number which is used as a reference in discriminating a stationary factor and a non-stationary factor which cause the bit error of the training check field signal TCF at each of the transmission speeds.

Accordingly, prior to the reception of the training check field signal TCF, the system controller 22 resets the timer 22T and clears the counter 22C. The training check field signal TCF received from the source facsimile machine 21 is demodulated into a data sequence in the modem 14 of the destination facsimile machine 21. In the destination facsimile machine 21, the system controller 22 supplies the data of the training check field signal TCF to the counter 22C one byte at a time and starts the timer 22T. The counter 22C counts a number of "1"s in the training check field signal TCF, that is, the bit error number. When the timer 22T counts a predetermined time, the system controller 22 stores the counted value in the counter 22C in the error memory part 23b, resets the timer 22T and clears the counter 22C. The above described operation is repeated while dividing the training check field signal TCF into the plurality of blocks until the training check field signal TCF ends. When the bit error number is counted for each block of the training check field signal TCF to the end of the training check field signal TCF, the result is stored in the error memory part 23b. As will be described later, the system controller 22 discriminates whether the training is a success or failure and whether the cause of the bit error is the stationary factor or the non-stationary factor by comparing the bit error number stored in the error memory part 23b and the predetermined reference value stored in the comparing memory part 23a.

Next, a description will be given of the operation of this second embodiment. As in the case of the facsimile machine 1 described before, the facsimile machine 21 similarly sets the transmission speed when transmitting and receiving a telegraphic message. The transmission speed is set by detecting the bit error number of the training check field signal TCF received from the source facsimile machine 21 and discriminating whether the training is a success or failure. This embodiment is characterized by the discrimination of whether or not the training is a success or failure based solely on the bit error caused by the stationary factor which is indicative of the true state or quality of the line. A description will hereinafter be given of a process of discriminating whether the training is a success or failure, that is, a transmission speed discriminating process, by referring to FIG. 10.

Figure 10:
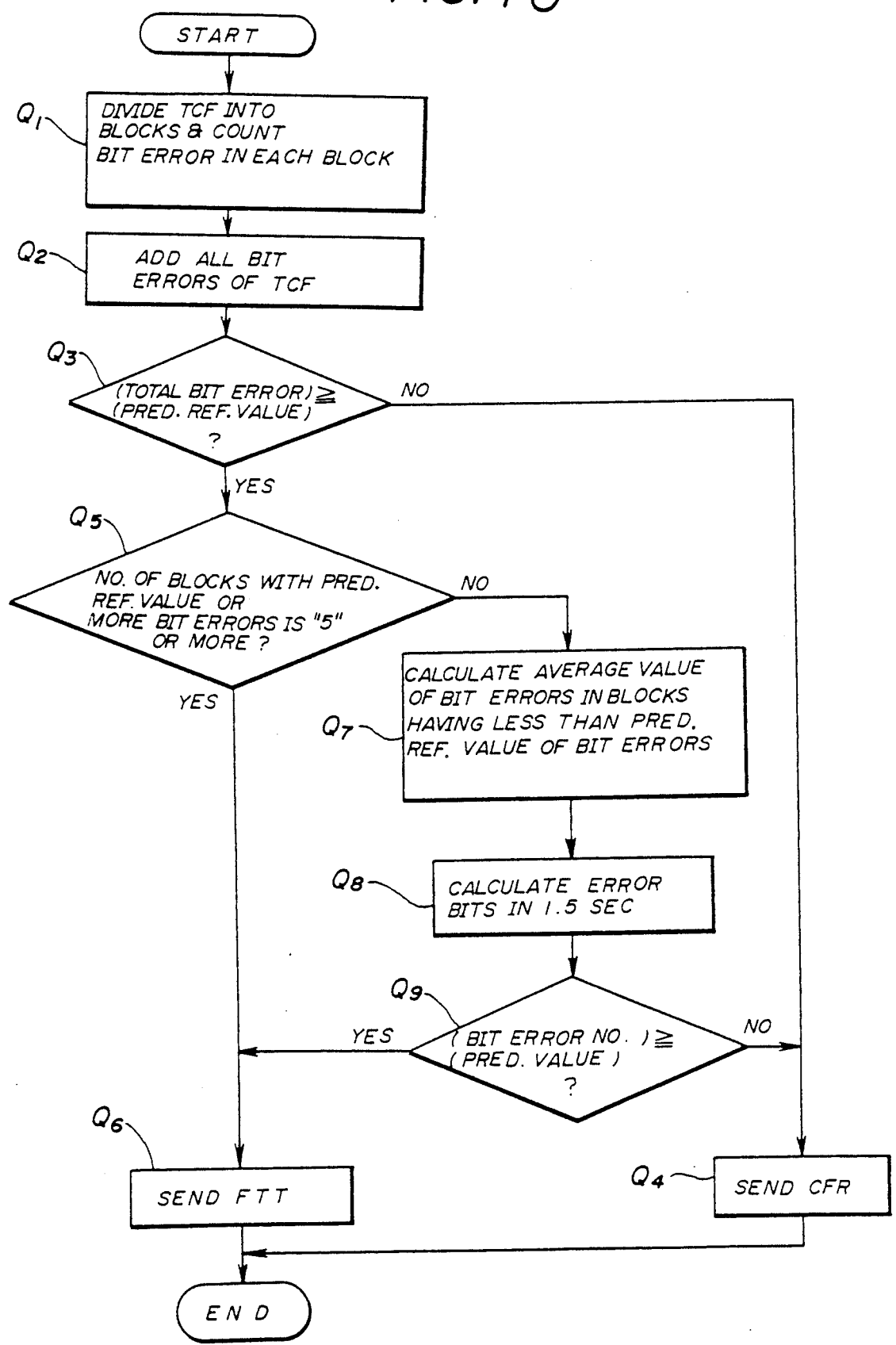
FIG. 10 is a flow chart for explaining a transmission speed discriminating process of a system controller shown in FIG. 8.

FIG. 10 shows the transmission speed discriminating process. When the destination facsimile machine 21 receives the training check field signal TCF via the network control unit 15, the system controller 22 divides the training check field signal TCF into a plurality of blocks and detects a bit error number for each of the blocks in a step Q1. The training check field signal TCF is divided into the blocks by subjecting the training check field signal TCF to a time-division by the timer 22T. In other words, the training check field signal TCF has consecutive "0"s for 1.5 seconds, and the training check field signal TCF is divided by resetting the timer 22T and clearing the counter 22C every time the timer 22T counts a predetermined time. For the sake of convenience, it is assumed that the training check field signal TCF is divided into 10 blocks and the timer 22T is reset and the counter 22C is cleared every time the timer 22T counts 150 ms which is 1/10 the 1.5 seconds. The number of bits of the training check field signal TCF per block is determined by the transmission speed. When the transmission speed is 9600 bps, the number of bits of the training check field signal TCF per block is approximately 1400 bits.

Figure 11:
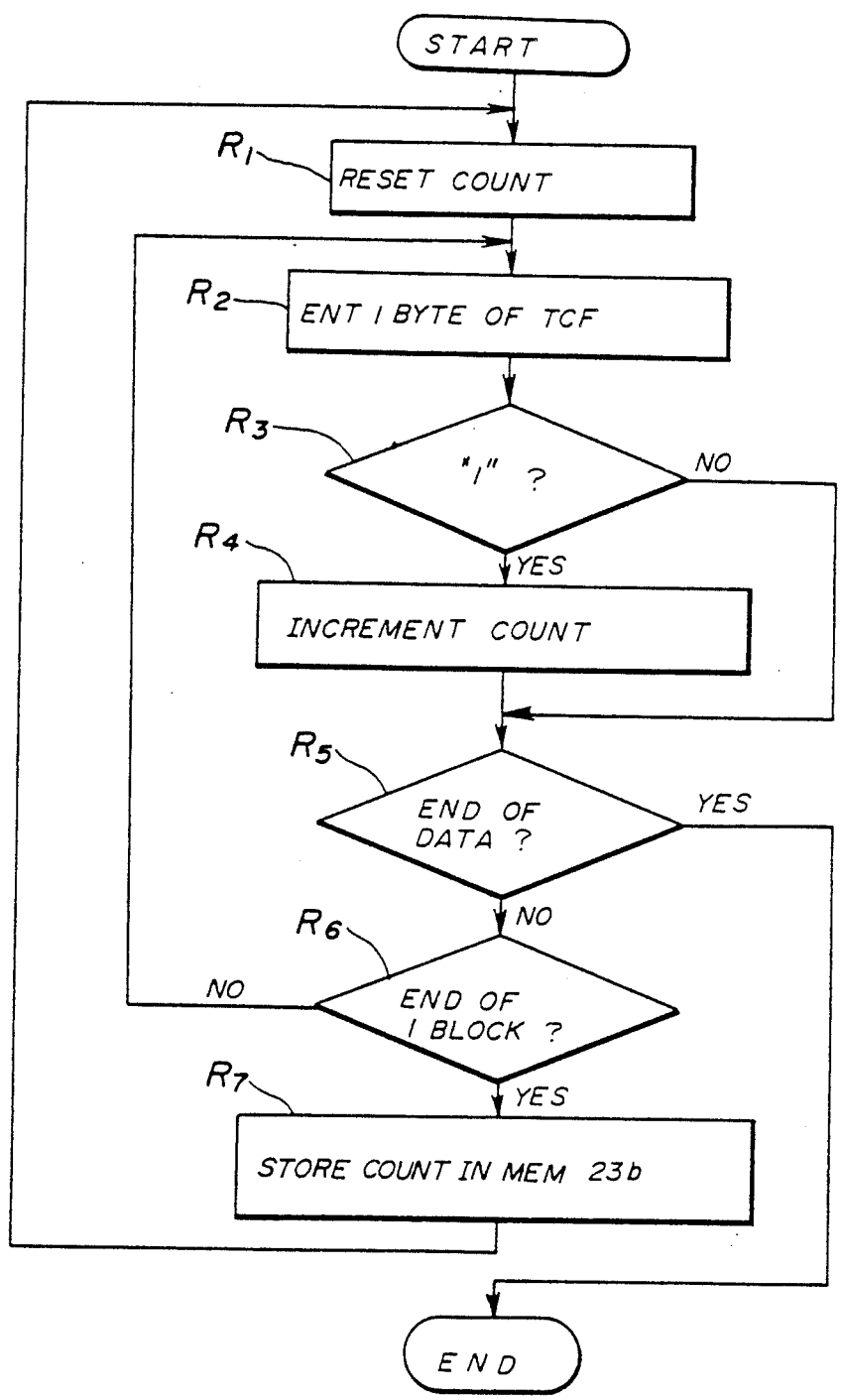
FIG. 11 is a flow chart for explaining a bit error counting process of the system controller shown in FIG. 8.

The bit error number of the training check field signal TCF is carried out according to a flow chart shown in FIG. 11. In FIG. 11, the system controller 22 clears the counter 22C in a step R1 and enters the received data of the training check field signal TCF one byte at a time in a step R2. A step R3 discriminates whether or not a bit of the entered byte is "1" for each of the bits of the entered byte. When the discrimination result in the step R3 is YES, a step R4 increments the counter 22C by one by judging that an error is generated in the training check field signal TCF which has the consecutive "0"s. When the discrimination result in the step R3 is NO or after the step R4, a step R5 discriminates whether or not the received data of the training check field signal TCF is ended. The process ends when the discrimination result in the step R5 is YES.

When the discrimination result in the step R5 is NO, a step R6 discriminates whether or not one block of the training check field signal TCF is ended. The process returns to the step R2 when the discrimination result in the step R6 is NO. Hence, the operation of counting the bit error number by the counter 22C is repeated until one block of the training check field signal TCF is ended. When the discrimination result in the step R6 is YES, a step R7 stores the counted value of the counter 22C in the error memory part 23b, and the process returns to the step R1. After the above bit error counting operation is carried out similarly for each block of the training check field signal TCF, the bit error counting process of the step Q1 shown in FIG. 10 is completed with respect to each block of the training check field signal TCF.

Next, a step Q2 adds the bit error numbers which are obtained with respect to each of the blocks of the training check field signal TCF and are stored in the error memory part 23b, so as to obtain a total bit error number for the training check field signal TCF. A step Q3 discriminates whether or not the total bit error number is greater than or equal to the predetermined reference value which is set in the comparing memory part 23a. When the discrimination result in the step Q3 is NO, it is judged that the state or quality of the line is satisfactory and the training is a success, so a step Q4 sends a confirmation to receive signal CFR to the source facsimile machine 21.

On the other hand, when the discrimination result in the step Q3 is YES, a step Q5 discriminates whether or not the bit error number is greater than or equal to the predetermined reference value (for example, 8 bits) stored in the comparing memory part 23a for each of the blocks and also distinguishes the bit error caused by the stationary factor and the bit error caused by the non-stationary factor. For example, the step Q5 discriminates whether or not a number of blocks which have a bit error number greater than or equal to the predetermined reference value is greater than or equal to 5, that is, whether or not the number of blocks which have the bit error number greater than or equal to 5 is one half or more the total number of blocks. When the discrimination result in the step Q5 is YES, it is judged that the bit errors caused by the stationary factor make up the majority of the total bit error number. Hence, in this case, a step Q6 judges that the training is a failure and sends a failure to train signal FTT to the source facsimile machine 21.

On the other hand, when the discrimination result in the step Q5 is NO, it is judged that a large number of bit errors caused by the non-stationary factor is included in the blocks which have the bit error number greater than the predetermined reference value. In this case, steps Q7 and Q8 calculate a bit error number of the training check field signal TCF caused by the stationary factor from an average bit error number of the blocks which have the bit error number less than the predetermined reference value. That is, the step Q7 calculates the average bit error number of the blocks which have the bit error number less than the predetermined reference value, and the step Q8 calculates a bit error number of the training check field signal TCF during a time of 1.5 seconds by multiplying 10 to the average bit error number. The bit error number of the training check field signal TCF calculated in the step Q8 corresponds to the bit error number caused solely by the stationary factor. A step Q9 discriminates whether or not the calculated bit error number is greater than or equal to a predetermined number so as to judge whether the training is a success or failure. When the discrimination result in the step Q9 is NO, it is judged that the training is a success and the step Q4 sends the confirmation to receive signal CFR to the source facsimile machine 21. On the other hand, it is judged that the training is a failure when the discrimination result in the step Q9 is YES, and the step Q6 sends the failure to train signal FTT to the source facsimile machine 21. The process ends after the step Q4 or Q6.

According to this embodiment, it is possible to judge the success or failure of the modem training based solely on the bit error caused by the stationary factor and excluding the bit error caused by the non-stationary factor. For this reason, it is possible to avoid a judgement that the training is a failure based on the bit error caused by the non-stationary factor, and it is hence possible to effectively reduce the time required for making the communication to set the transmission speed. As a result, it is possible to reduce the accounting on the communication.

In the described embodiments, the training check field signal TCF is divided into the blocks by the time-division. However, it is of course possible to divide the training check field signal TCF into the blocks in terms of a number of bits, for example. In addition, the number of divided blocks of the training check field signal TCF is of course not limited to 10.

Further, the present invention is not limited to these embodiments, but various variations and modifications may be made without departing from the scope of the present invention.

What is claimed is

1. A facsimile communication method in which a receiving facsimile machine receives a training check field signal TCF from a transmitting facsimile machine and sends a confirmation to receive signal CFR or a failure to train signal FTT to the transmitting facsimile machine depending on a result of the reception of the training check field signal TCF so as to determine a modem transmission speed, said facsimile communication method comprising the steps of:

detecting a number of erroneous bits in the training check field signal TCF which is sent from the transmitting facsimile machine at an initial modem transmission speed and received by the receiving facsimile machine;

setting the modem transmission speed based on the detected number of erroneous bits;

adding a facsimile information bit which indicates the set modem transmission speed to the failure to train signal FTT which is sent from the receiving facsimile machine to the transmitting facsimile machine; and sending the training check field signal TCF from the transmitting facsimile machine to the receiving facsimile machine at the modem transmission speed indicated by said failure to train signal FTT.

2. The facsimile communication method as claimed in claim 1 which further comprises the step of sending the confirmation to receive signal CFR from the receiving facsimile machine to the transmitting facsimile machine when the detected number of erroneous bits is less than a predetermined value.

3. The facsimile communication method as claimed in claim 1 wherein said step of setting the modem transmission speed looks up a table of transmission speeds to be set with respect to ranges of the detected number of erroneous bits.

4. The facsimile communication method as claimed in claim 3 wherein said table is provided for different initial modem transmission speeds.

5. The facsimile communication method as claimed in claim 3 which further comprises the step of sending the confirmation to receive signal CFR from the receiving facsimile machine to the transmitting facsimile machine when the detected number of erroneous bits is less than a predetermined value.

6. The facsimile communication method as claimed in claim 1 wherein said step of detecting the number of erroneous bits counts a number of "1"s in the received training check field signal TCF by detecting each bit of the received training check field signal TCF.

7. A facsimile communication method in which a receiving facsimile machine receives a training check field signal TCF from a transmitting facsimile machine and sends a confirmation to receive signal CFR or a failure to train signal FTT to the transmitting facsimile machine depending on whether a training is a success or failure, said facsimile communication method comprising the steps of:

dividing the training check field signal TCF which is sent from the transmitting facsimile machine and received by the receiving facsimile machine into a plurality of blocks and detecting a number of erroneous bits in each of the blocks;

detecting the success or failure of the training based on the detected number of erroneous bits;

sending the confirmation to receive signal CFR from the receiving facsimile machine to the transmitting facsimile machine when the success of the training is detected; and sending the failure to train signal FTT from the receiving facsimile machine to the transmitting facsimile machine when the failure of the training is detected, said step of detecting the success or failure including a first substep of detecting the success when a total number of erroneous bits in the blocks is less than a predetermined value and a second substep of detecting the success or failure based on the number of erroneous bits in each block when the total number of erroneous bits in the blocks is greater than or equal to the predetermined value.

8. The facsimile communication method as claimed in claim 7 wherein said second substep detects the success when a number of blocks which have more than a predetermined number of erroneous bits is less than a specific value.

9. The facsimile communication method as claimed in claim 7 wherein said second substep detects the success when an average value of numbers erroneous bits of blocks which have more than a predetermined number of erroneous bits is less than a specific value.

10. The facsimile communication method as claimed in claim 7 which further comprises the steps of setting a modem transmission speed based on the detected number of erroneous bits, adding a facsimile information bit which indicates the set modem transmission speed to the failure to train signal FTT which is sent from the receiving facsimile machine to the transmitting facsimile machine, and sending the training check field signal TCF from the transmitting facsimile machine to the receiving facsimile machine at the modem transmission speed indicated by said failure to train signal FTT.

11. A facsimile machine which receives a training check field signal TCF from a transmitting facsimile machine and sends a confirmation to receive signal CFR or a failure to train signal FTT to the transmitting facsimile machine depending on a result of the reception of the training check field signal TCF so as to determine a modem transmission speed, said facsimile machine comprising:

modem means coupled to a data transmission path for modulating a transmitting image data which is transmitted to the data transmission path and for demodulating received image data which is received from the data transmission path;

communication control means coupled to said modem means for controlling communications to and from the data communication path;

reading means for reading a document image which is to be transmitted and for outputting the transmitting image data describing the document;

recording means for recording an image described by the received image data onto a recording sheet; and system control means for controlling operations of said communication control means, said reading means and said recording means, said system control means comprising means for detecting a number of erroneous bits in the training check field signal TCF which is sent from the transmitting facsimile machine at an initial modem transmission speed and received by the receiving facsimile machine, means for setting the modem transmission speed based on the detected number of erroneous bits, means for adding a facsimile information bit which indicates the set modem transmission speed to the failure to train signal FTT which is sent from the receiving facsimile machine to the transmitting facsimile machine, and means for sending the training check field signal TCF from the transmitting facsimile machine to the receiving facsimile machine at the modem transmission speed indicated by said failure to train signal FTT.

12. The facsimile machine as claimed in claim 11 wherein said system controller further comprises means for sending the confirmation to receive signal CFR from the receiving facsimile machine to the transmitting facsimile machine when the detected number of erroneous bits is less than a predetermined value.

13. The facsimile machine as claimed in claim 11 wherein said means for setting the modem transmission speed looks up a table of transmission speeds to be set with respect to ranges of the detected number of erroneous bits.

14. The facsimile machine as claimed in claim 13 wherein said table is provided for different initial modem transmission speeds.

15. The facsimile machine as claimed in claim 13 wherein said system controller further comprises means for sending the confirmation to receive signal CFR from the receiving facsimile machine to the transmitting facsimile machine when the detected number of erroneous bits is less than a predetermined value.

16. The facsimile machine as claimed in claim 11 wherein said means for detecting the number of erroneous bits counts a number of "1"s in the received training check field signal TCF by detecting each bit of the received training check field signal TCF.

17. A facsimile machine which receives a training check field signal TCF from a transmitting facsimile machine and sends a confirmation to receive signal CFR or a failure to train signal FTT to the transmitting facsimile machine depending on whether a training is a success or failure, said facsimile machine comprising:

modem means coupled to a data transmission path for modulating a transmitting image data which is transmitted to the data transmission path and for demodulating received image data which is received from the data transmission path;

communication control means coupled to said modem means for controlling communications to and from the data communication path;

reading means for reading a document image which is to be transmitted and for outputting the transmitting image data describing the document;

recording means for recording an image described by the received image data onto a recording sheet; and system control means for controlling operations of said communication control means, said reading means and said recording means, said system control means comprising means for dividing the training check field signal TCF which is sent from the transmitting facsimile machine and received by the receiving facsimile machine into a plurality of blocks and detecting a number of erroneous bits in each of the blocks, means for detecting the success or failure of the training based on the detected number of erroneous bits, means for sending the confirmation to receive signal CFR from the receiving facsimile machine to the transmitting facsimile machine when the success of the training is detected, and means for sending the failure to train signal FTT from the receiving facsimile machine to the transmitting facsimile machine when the failure of the training is detected, said means for detecting the success or failure including first means for detecting the success when a total number of erroneous bits in the blocks is less than a predetermined value and a second means for detecting the success or failure based on the number of erroneous bits in each block when the total number of erroneous bits in the blocks is greater than or equal to the predetermined value.

18. The facsimile machine as claimed in claim 17 wherein said second means detects the success when a number of blocks which have more than a predetermined number of erroneous bits is less than a specific value.

19. The facsimile machine as claimed in claim 17 wherein said second means detects the success when an average value of numbers erroneous bits of blocks which have more than a predetermined number of erroneous bits is less than a specific value.

20. The facsimile communication method as claimed in claim 17 wherein said system control means further comprises means for setting a modem transmission speed based on the detected number of erroneous bits, means for adding a facsimile information bit which indicates the set modem transmission speed to the failure to train signal FTT which is sent from the receiving facsimile machine to the transmitting facsimile machine, and means for sending the training check field signal TCF from the transmitting facsimile machine to the receiving facsimile machine at the modem transmission speed indicated by said failure to train signal FTT.

* * * * *